(12) United States Patent
Rhetat et al.

(10) Patent No.: US 8,205,543 B2
(45) Date of Patent: *Jun. 26, 2012

(54) PRESSURE COOKER EQUIPPED WITH A SCREEN

(75) Inventors: Eric Jacques Rhetat, Dijon (FR); Michel Pierre Cartigny, Mirebeau sur Beze (FR)

(73) Assignee: Seb S.A., Ecully (FR)

( * ) Notice: Subject to any disclaimer, the term of this patent is extended or adjusted under 35 U.S.C. 154(b) by 1013 days.

This patent is subject to a terminal disclaimer.

(21) Appl. No.: 12/174,992

(22) Filed: Jul. 17, 2008

(65) Prior Publication Data

US 2009/0020020 A1    Jan. 22, 2009

(30) Foreign Application Priority Data

Jul. 20, 2007  (FR) ...................................... 07 05264

(51) Int. Cl.
*A23L 1/00*    (2006.01)

(52) U.S. Cl. ........................................................ 99/337
(58) Field of Classification Search ...................... 99/337
See application file for complete search history.

(56) References Cited

U.S. PATENT DOCUMENTS

| 4,103,801 | A | * | 8/1978 | Walker ...................... 220/203.07 |
| 6,425,320 | B1 | * | 7/2002 | Chameroy et al. .............. 99/337 |
| 6,669,047 | B2 | * | 12/2003 | Wooderson et al. .......... 220/316 |

* cited by examiner

*Primary Examiner* — Raeann Gorden
(74) *Attorney, Agent, or Firm* — Thomas, Kayden, Horstemeyer & Risley, LLP

(57) ABSTRACT

A pressure cooker equipped with a screen is disclosed, having a pan with a lid designed to be added to the pan, the lid having locking and release elements. The locking/release elements have a locking opening fitted through the wall of the pan and one pin with a mobile mounting on the lid, movable between a locked position with the pin engaged inside the locked opening and a released position where the pin is clear of the opening. The cooker includes a screen attached to the pan to mask the locking opening.

8 Claims, 5 Drawing Sheets

A-A

PRESSURE COOKER EQUIPPED WITH A SCREEN

CROSS REFERENCE RELATED APPLICATIONS:

This application claims priority to copendinq French Patent Application No. 07 05264 filed July 20, 2007, which is entirely incorporated herein by reference.

This invention relates to the general technical field of kitchen utensils of the cooking recipient type, and especially to that of pressure cookers, which is to say pressurised cooking pots designed to cook food they contain using pressurised steam.

This invention relates more particularly to a domestic pressure cooker comprising:
  a pan which itself comprises a wall,
  a lid designed to be attached to the pan to form with the latter a cooking chamber that is substantially impervious,
  and locking/release means of the lid from the pan.

Domestic pressure cookers are well-known. They are usually composed of a metallic pan designed to accommodate food and a lid, also metallic, designed to be added and locked onto the pan to form with the latter an impervious cooking chamber.

Such a pressure cooker is designed to be subjected to the influence of a source of heat (such as for example a cooking hub) so as to permit the increase in pressure and temperature of the chamber and thus the pressurised cooking of the food contained therein.

There are different types of means for locking/releasing the lid from the pan, especially such as systems with clamps, bayonets or jaws, to only mention a few of the most common.

These known locking/release means generally carry out perfectly, particularly from a safety point of view, their function of subjecting the lid to the pan so that the cooking chamber thus created may increase in pressure reliably and safely.

These known locking/release means however have a very technical visual appearance that often generate a feeling of fear for many potential users. The latter, particularly when they are not used to pressurised cooking, may indeed fear that they will not know how to use an appliance that appears so technical, which seems very far removed from traditional cooking utensils, such as pans, that they are used to. The presence of the locking/release means also reminds these potential users, even subconsciously, that pressure cookers operate at high levels of pressure and temperature. This may heighten the fear of said users and lead to a certain reticence for them to use a pressure cooker, which to them appears more like a complex and dangerous machine than a domestic cooking utensil.

Finally, the known pressure cookers often generate a feeling of fear for many users or potential users. A feeling that is generally unfounded as these appliances are generally very simple and safe to use. This feeling of fear remains nevertheless present in their minds and dissuades many people from using these appliances in spite of the benefits, in terms of rapidity and quality of cooking, that they can provide.

The assigned purposes of the invention aim to overcome the various disadvantages mentioned above and to propose a new domestic pressure cooker whose construction helps to reduce the feeling of fear in particular of the user.

Another purpose of the invention is to propose a new domestic pressure cooker of a particularly simple construction.

Another purpose of the invention is to propose a new domestic pressure cooker of a particularly compact and cheap construction.

Another purpose of the invention is to propose a new domestic pressure cooker that is very simple, rapid and cheap to manufacture.

Another purpose of the invention is to propose a new domestic pressure cooker whose design uses a very limited number of different parts.

Another purpose of the invention is to propose a new domestic pressure cooker whose general appearance is very similar to that of a normal pan.

The assigned purposes of the invention are achieved by a domestic pressure cooker at least comprising:
  a pan which itself comprises a wall,
  a lid designed to be added to the pan to form a cooking chamber with the latter,
  locking/release means of the lid from the pan, wherein said pressure cooker is characterised in that the locking/release means comprise at least one locking opening positioned through the wall of the pan and also a pin with a mobile mounting on the lid between a locked position of the lid where the pin is engaged inside the locking opening and a released position of the lid where the pin is clear of the locking opening, wherein said pressure cooker further comprises a screen attached to the pan to mask said locking opening so that the latter is substantially hidden from the outside of the cooking chamber.

Other specific aspects and advantages of the invention will appear and in more detail upon reading the following description, in reference to the appended drawings provided by way of illustration and in no way restrictively, in which.

Figure 1:
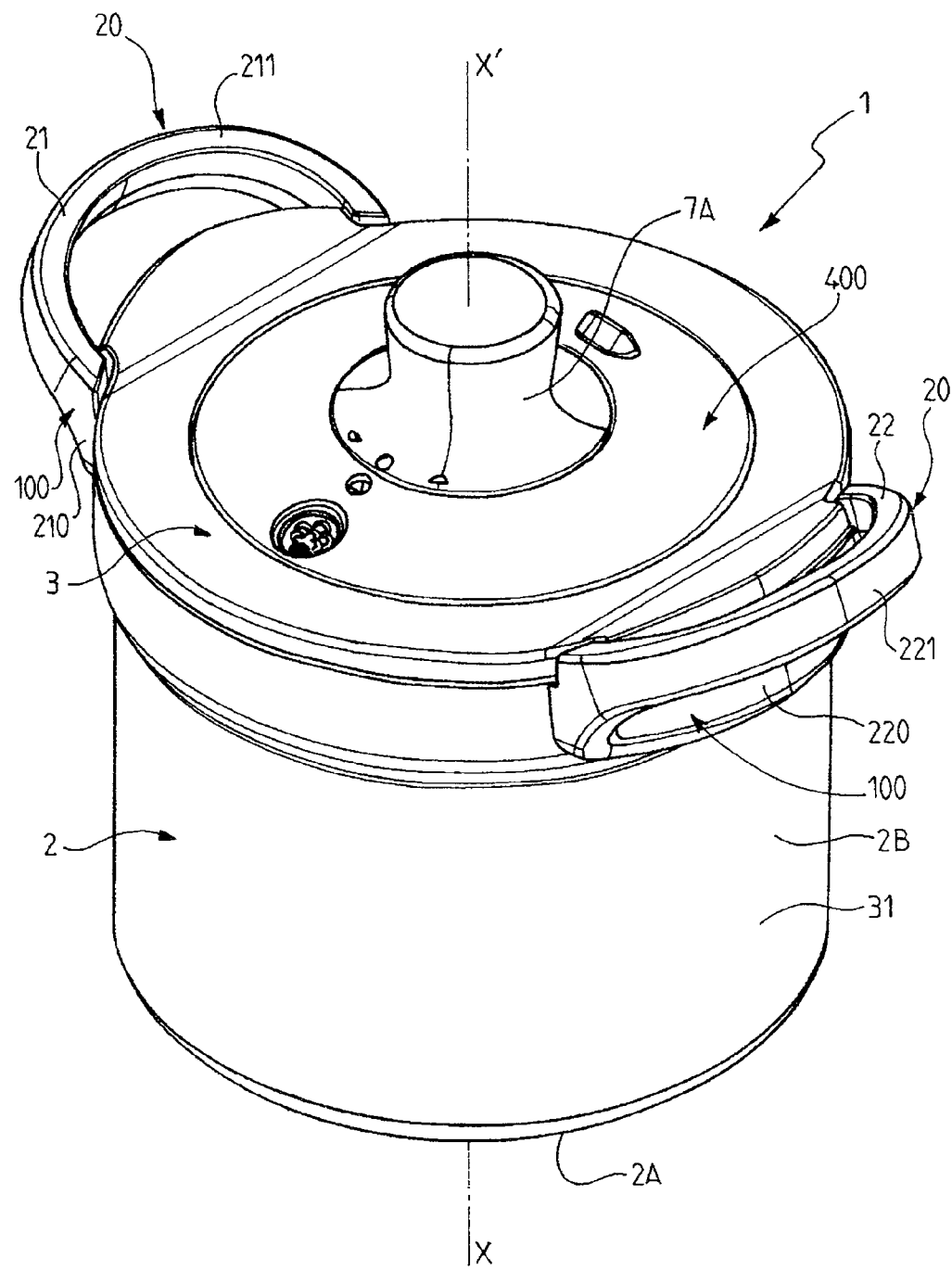
FIG. 1 illustrates, according to a general perspective view, a domestic pressure cooker compliant with the invention.
Figure 2:
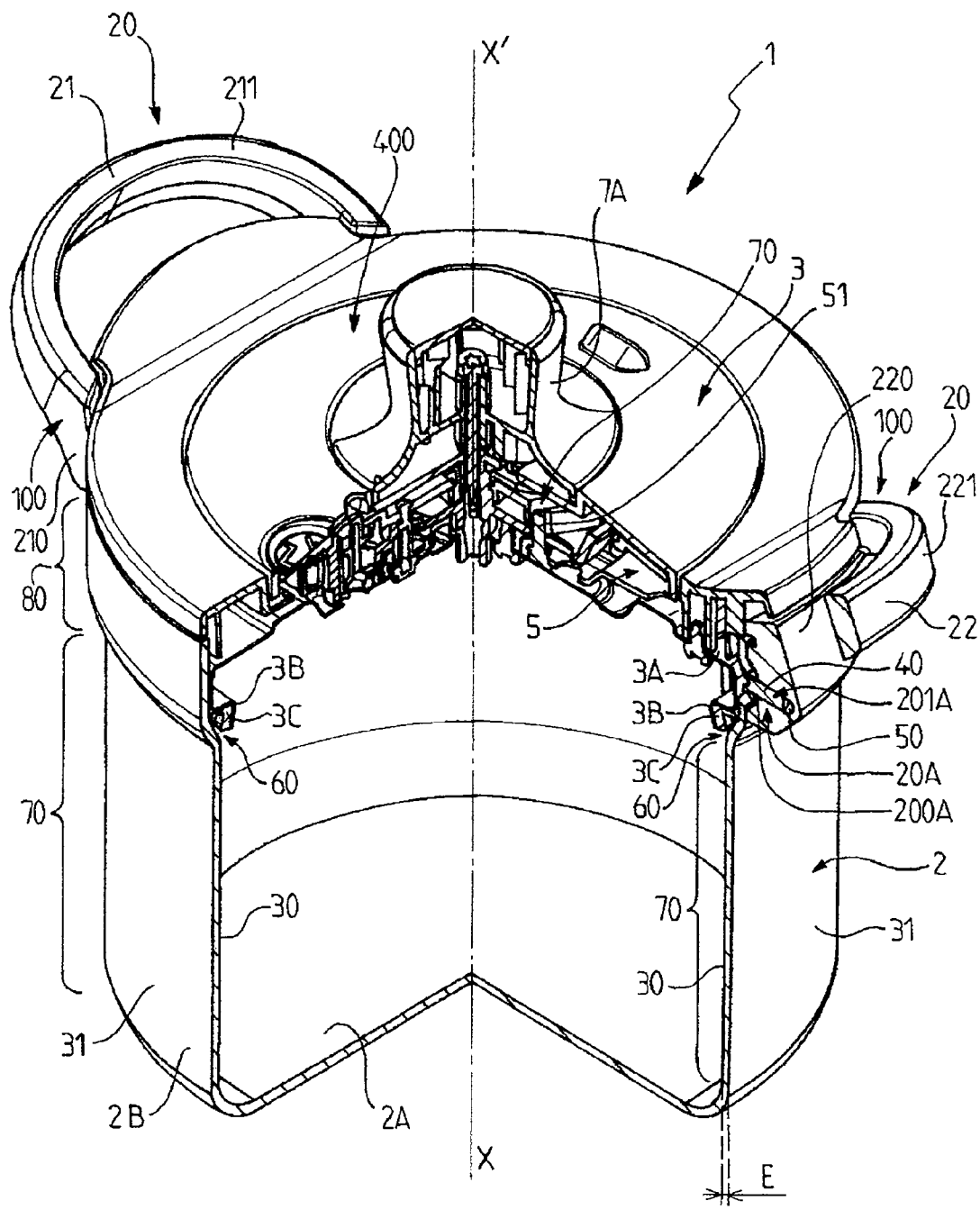
FIG. 2 illustrates, according to a general partially cross sectioned perspective view, according to two cross section planes that are substantially perpendicular, the pressure cooker of FIG. 1.

The pressure cooker 1 compliant with the invention is designed to cook various foods under pressure in a domestic context. It therefore forms a domestic pressure cooker.

The pressure cooker 1 compliant with the invention is therefore a kitchen utensil of a portable (which is to say it may be moved manually) and independent nature.

Advantageously, the pressure cooker 1 compliant with the invention is a thermally passive pot, designed to increase in pressure under the effect of an external source of heat, such as a cooking hob.

Preferably, the pressure cooker 1 compliant with the invention comprises a pan 2 forming a cooking recipient and advantageously substantially has a revolution symmetry according to an axis X-X'. In the rest of the description, the adjective "axial" refers to the direction of this axis of symmetry X-X', a direction which is similar to the vertical direction when the appliance is in normal use. The pan 2 is for example and usually manufactured by stamping a blank made from a metallic material such as aluminum or stainless steel.

The pan 2 also comprises a wall, wherein said wall itself comprises, in the embodiment shown:
a base 2A, which has for example a disc shape,
and a lateral wall 2B, which rises from and at the base 2A, wherein said lateral wall 2B has a substantially annular form which defines an upper opening 2C permitting the food to be introduced into the pan 2, so that it may be cooked; said lateral wall 2B also has an inside face 30 positioned opposite the inside of the pan 2 and an outside face 31 opposite.

The pressure cooker 1 compliant with the invention also comprises a lid 3 designed to be added onto said pan 2 to form a cooking chamber with the latter, that is preferably substantially impervious, which is to say sufficiently hermetic to allow the pressure inside it to increase.

Consequently, the chamber formed by joining the pan 2 and the lid 3 is designed to permit a considerable increase in the pressure inside it, so that during cooking, the pressure inside the chamber may be significantly higher than the atmospheric pressure, and for example exceed said atmospheric pressure by a value equal to or greater than 10 kPa, and preferably equal to or greater than 20 kPa. It may also be envisaged, in order to permit very rapid and efficient cooking, for the chamber to be designed so that the pressure inside it may exceed the atmospheric pressure by a value substantially between 40 and 110 kpa, and preferably substantially between 50 and 100 kPa.

The lid 3 preferentially takes a discoid shape complementary to the shape of the pan 2. Advantageously, the lid 3 may be locked or released as required on the pan 2, wherein locking the lid 3 permits the chamber to increase in pressure without the lid 3 escaping under the effect of the pressure.

For this purpose, the pressure cooker 1 preferably comprises locking/release means 4 of the lid 3 onto the pan 2. The locking/release means 4 are advantageously designed to move between a configuration where the lid 3 is locked in relation to the pan 2 (illustrated in particular in FIG. 3) in which the lid 3 is attached to the pan 2, and a configuration where the lid 3 is released in relation to the pan 2 (illustrated in particular in FIG. 4), in which the lid 3 may be freely separated from the pan 2.

As illustrated in the figures, the locking/release means 4 at least comprise a locking opening 50A, 50B, 60A, 60B through the wall of the pan 2, which is to say passing through the entire thickness E of the wall of the pan. In the example illustrated in the figures, the pressure cooker 1 comprises four locking openings 50A, 50B, 60A, 60B preferably located in the upper part 80 of the wall 2B of the pan 2, which is to say towards the upper opening 2C of the pan 2. As illustrated in the figures, said locking openings 50A, 50B, 60A, 60B are preferably grouped into pairs, wherein said pairs are diametrically opposite one another.

Compliant with the invention, the locking/release means 4 further comprise at least one pin 5A, 5B, 6A, 6B with a mobile mounting on the lid 3 between a position where the lid 3 is locked (illustrated in particular in FIG. 3) in which the pin 5A, 5B, 6A, 6B is engaged in the corresponding locking opening 50A, 50B, 60A, 60B to prevent any separation of the lid 3 from the pan 2, in the same way as a pin-strike plate system, and a position where the lid 3 is released (illustrated in FIG. 4), in which the pin 5A, 5B, 6A, 6B is clear of the corresponding locking opening 50A, 50B, 60A, 60B to permit the lid 3 to move freely in relation to the pan, and in particular for the use to separate the lid 3 and the pan 2.

Preferably, as illustrated in the figures, the pressure cooker 1 comprises a number of pins 5A, 5B, 6A, 6B corresponding to the number of locking openings 50A, 50B, 60A, 60B, which is to say that it comprises in this case four pins 5A, 5B, 6A, 6B designed to engage respectively with the openings 50A, 50B, 60A, 60B. Preferably, the pins 5A, 5B, 6A, 6B have a mounting that is mobile in translation on the lid 3 between a retracted position (illustrated in FIG. 4) in which the pins 5A, 5B, 6A, 6B are retracted inside the lid 3 so that they do not protrude laterally beyond the latter, and a deployed position (illustrated in FIG. 3) in which each pin 5A, 5B, 6A, 6B penetrates into the respective opening 50A, 50B, 60A, 60B, wherein the passage from the retracted position to the deployed position takes place by a translation movement according to a direction that is substantially parallel to the main extension plane of the lid 3, which is preferably parallel to the base 2A of the pan 2.

According to the embodiment illustrated in the figures the locking/release means 4 advantageously comprises two bifid segments 5, 6 positioned diametrically opposite relatively to one another with respect to the X-X' axis, wherein each bifid segment 5, 6 respectively forms the first pair of pins 5A, 5B and the second pair of pins 6A, 6B. For example, each bifid segment is formed by a one piece metal plate of which one of the ends has a fork shape, wherein each prong of the fork corresponds to a pin 5A, 5B, 6A, 6B. Each segment 5, 6 is has a radial translation mounting with respect to the X-X' axis.

Said segments 5, 6 are driven by any means known to a person skilled in the art. For example, as illustrated in the figures, the locking/release means 4 are manually controlled by the user. For this purpose, the pressure cooker 1 preferably comprises a control knob 7A mounted on the lid 3 which rotates according to the X-X' axis. The knob 7A is mechanically connected to the segments 5, 6 so that the rotation of the knob 7A in one direction causes the radial (centripetal) retraction of the pins 5A, 5B, 6A, 6B while the rotation of the knob 7A in the opposite direction inversely causes the centrifugal radial movement of the pins 5A, 5B, 6A, 6B allowing the latter to be engaged into the corresponding locking openings 50A, 50B, 60A, 60B. The segments 5, 6 may be driven by the knob 7A by any means known to a person skilled in the art. For example, the knob 7A may be attached to a plate which has drive openings 70 in it, wherein the segments 5, 6 are themselves fitted with respective pins 51 that are engaged in the drive openings 70. Consequently, the rotation of the knob 7A causes the concomitant rotation of the drive openings 70 which, by a ramp effect and in combination with a translation guidance of the segments 5, 6, transform their rotational movement into a radial translation movement of said segments 5, 6.

Compliant with the invention, the pressure cooker 1 comprises a screen 100 attached to the pan 2 (and preferably attached to the lateral wall 2B of the pan 2) to mask said at least one locking opening 50A, 50B, 60A, 60B so that the latter is substantially hidden from the outside of the cooking chamber.

In other terms, the purpose of the screen 100 is to hide the openings 50A, 50B, 60A, 60B from the view of the user when the pressure cooker 1 is closed, which is to say when the lid 3 is fitted to the pan 2. Consequently the part of the locking system that may cause the most fear to the user, as well as its operating principle, are hidden from the user. This permits the feeling of fear experienced by the user to be reduced when using the pressure cooker 1. This also permits the reliability of the locking and the safety of the user to be enhanced, by preventing any object from being introduced inadvertently into a locking opening, thus preventing the correct operation of the appliance.

Preferably, in order to hide the rest of the locking/release system, the pressure cooker 1 comprises a cover 400 added and attached to the lid 3 especially to conceal the segments 5, 6 and their drive means (opening 70, pin 51). The combination of the cover 400, the screen 100, and locking/release means 4 based on the engagement of pins and locking openings thus permits the lid locking system to be completely hidden from the user, and in a very simple, reliable and cheap manner.

Advantageously, the pressure cooker 1 at least comprises a gripping part 20 attached to the pan 2, and preferably attached directly to the wall of the pan 2. The gripping part 20 is designed to allow the user to handle not just the pan 2 on its own but also and most especially the complete pressure cooker 1 (formed by the pan 2 and lid 3 assembly), in particular when said pressure cooker 1 is filled with food that is cooked or to be cooked, possibly accompanied by a cooking liquid. The gripping part 20 is therefore designed to permit the pressure cooker 1 to be held easily and firmly, so that the user may move the pressure cooker 1 manually as required without the risk of the latter being dropped. Preferably and as illustrated in the figures, the gripping part 20 at least comprises one handle 21 attached to the wall of the pan 2, on the outside of said pan 2. Said handle 21 substantially extends from and towards the outside of the pan 2, radially with respect to the X-X' axis.

In the example illustrated in the figures, the pressure cooker 1 has two handles 21, 22, positioned diametrically opposite with respect to one another in consideration of the X-X' axis, wherein said handles 21, 22 extend radially from the lateral wall 2B of the pan 2, towards the outside of the latter.

Very advantageously, the gripping part 20 is conformed and positioned on the pan 2 to form said screen 100. In other terms, in this especially preferred embodiment which corresponds to the example illustrated in the figures, the gripping part 20 has a double function, as it permits the pressure cooker 1 to be handled and also the locking openings 50A, 50B, 60A, 60B to be hidden. Such a double function is especially of interest as concerns the simplicity of industrial manufacture and the associated costs.

Preferably and as illustrated in the figures, the two handles 21, 22 are identical, and each comprise for example a base 210, 220 attached directly to the wall of the pan 2, against the outside face 31 of the latter. From each base 210, 220, a respective handle 211, 221 extends that is designed to be held manually by the user.

Figure 3:
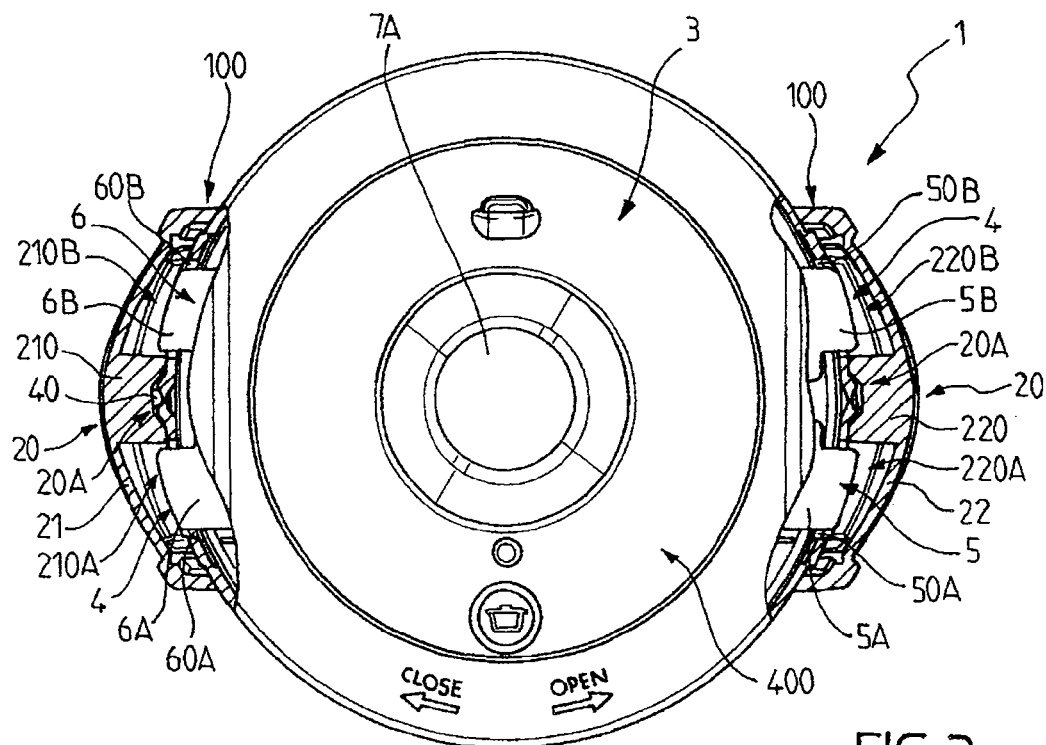
FIG. 3 illustrates, according to a top view that is particularly exposed and cross sectioned, the pressure cooker of FIGS. 1 and 2 with the lid locked onto the pan.
Figure 4:
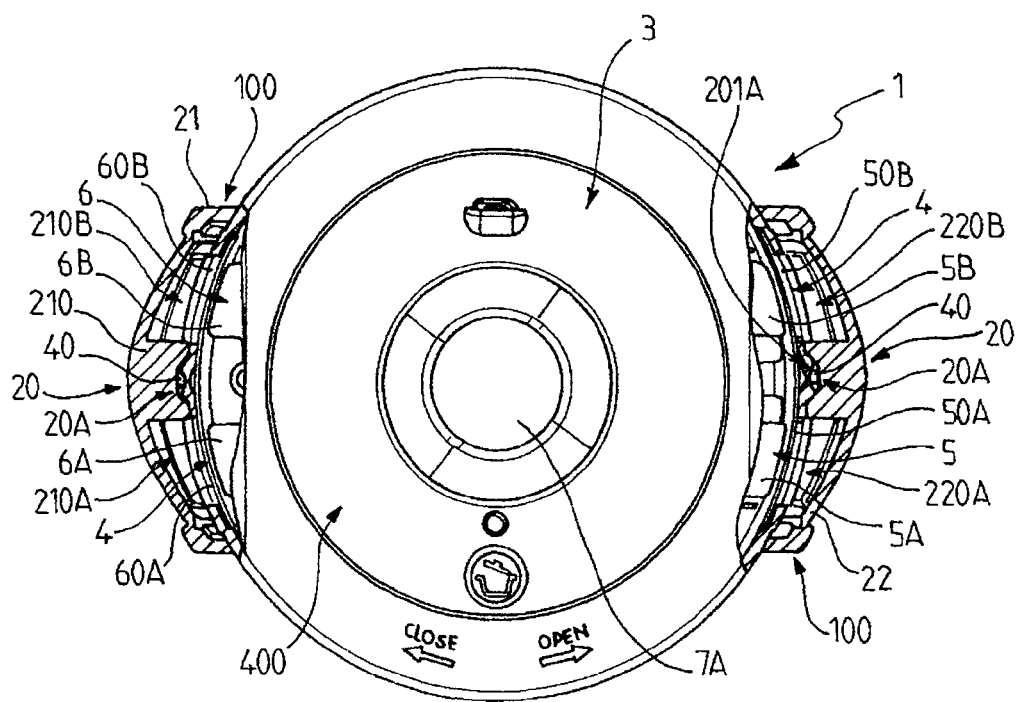
FIG. 4 illustrates, according to a top view that is partially exposed and cross sectioned, the pressure cooker of FIGS. 1 to 3 with its lid released from the pan.
Figure 5:
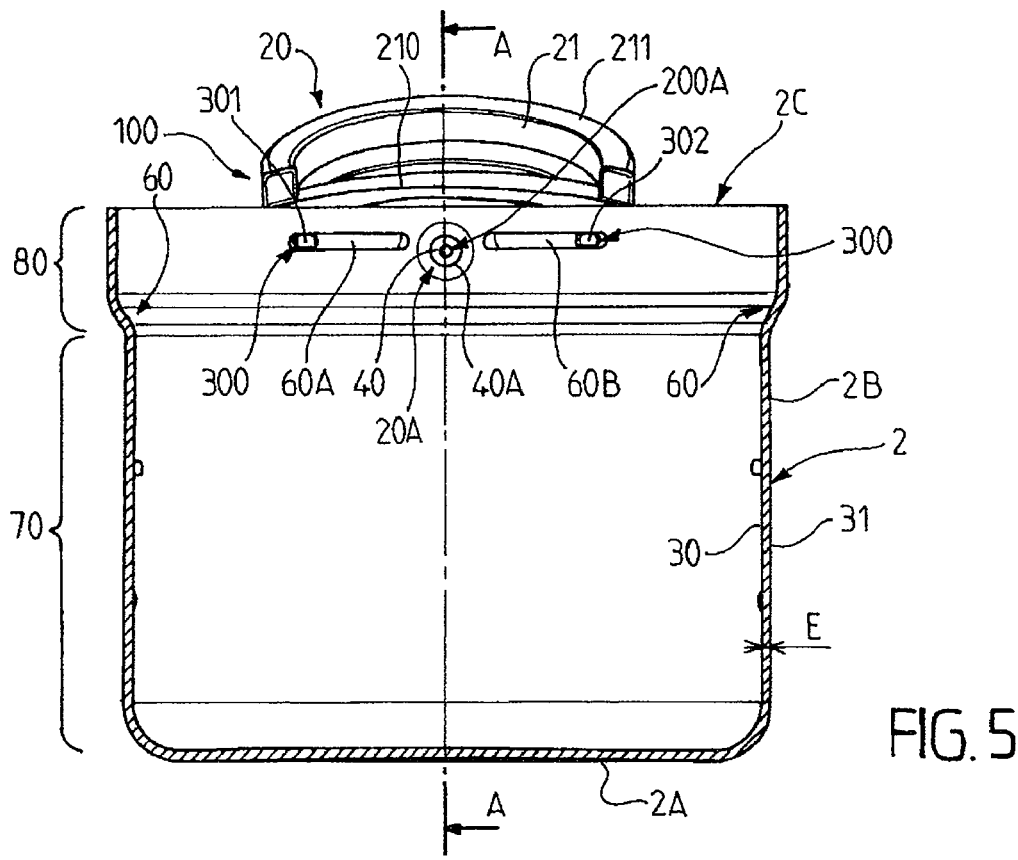
FIG. 5 illustrates, according to a lateral cross sectional view, the pan of the pressure cooker illustrated in FIGS. 1 to 4.
Figure 6:
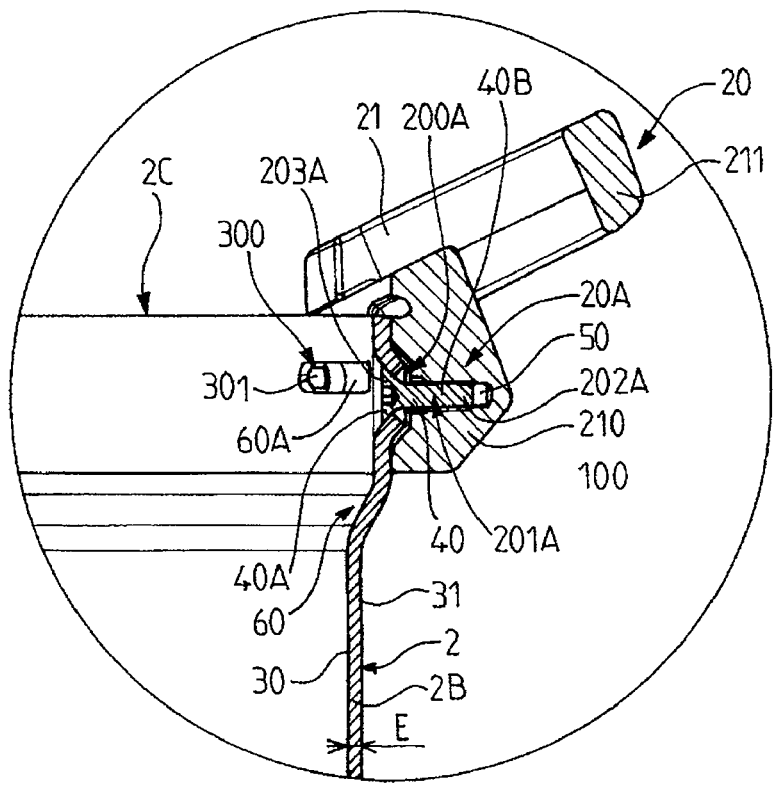
FIG. 6 illustrates, according to a cross sectional view according to the line A-A of FIG. 5, an enlarged detail of the pan illustrated in FIG. 5.
Figure 7:
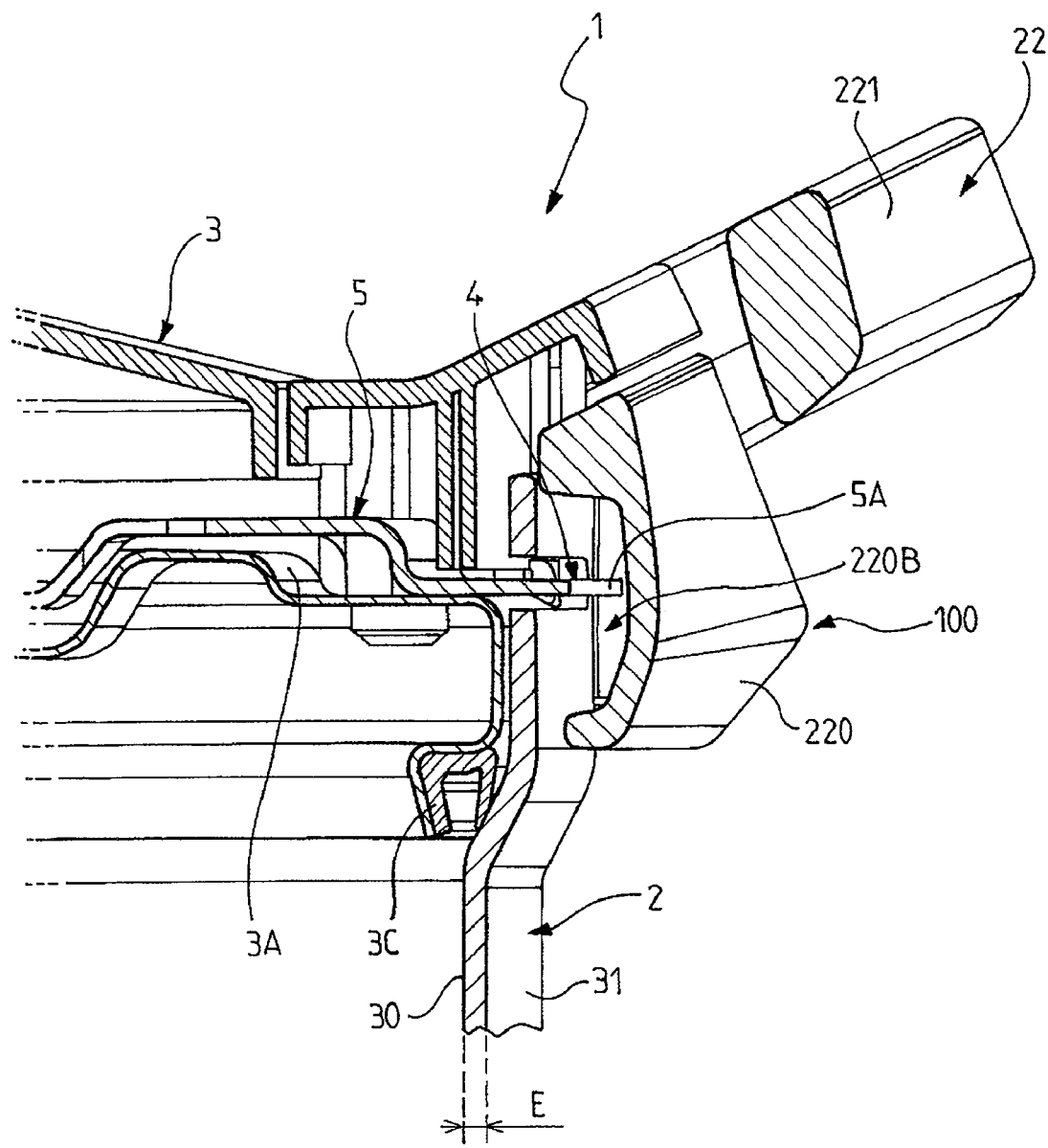
FIG. 7 illustrates, according to a cross sectioned perspective view, a detail of the pressure cooker illustrated in FIGS. 1 to 4.

Preferably, to ensure safe, stable and reliable locking, a portion of said pin 5A, 5B, 6A, 6B protrudes towards the outside of the pan 2 through the corresponding locking opening 50A, 50B, 60A, 60B, which is to say that each pin 5A, 5B, 6A, 6B passes completely through the respective opening 50A, 50B, 60A, 60B and protrudes from the other side of the pan 2, as illustrated especially in FIGS. 3 and 5.

In this case and as illustrated in the figures, it is advantageous for the screen 100 to be fitted with at least one blind inside recess opening onto the corresponding locking opening 50A, 50B, 60A, 60B to accommodate said protruding portion of pin inside it.

Consequently, according to the embodiment illustrated in the figures, each base 210, 220 advantageously has cavities 210A, 210B, 220A, 220B forming blind inside recesses, wherein said cavities are designed to be positioned opposite the openings 50A, 50B, 60A, 60B so as to form a recess designed to respectively accommodate each 10 pin 5A, 5B, 6A, 6B when the latter are in the deployed position and protrude beyond the outside wall 31.

Preferably, the gripping part 20 is attached to the pan 2 by means of at least one means of attachment 20A permitting a mechanical connection to be formed, and preferably an embedded mechanical connection, between the gripping part 20 and the pan 2. Preferably, the gripping part 20 is distinct and independent from the pan 2, and is added and attached to the latter, by attachment means 20A. The attachment means 20A thus permit it to be subjected, which is to say to attach the gripping part 20 directly to the pan 2.

Advantageously, the attachment means 20A at least comprise an elongated attachment element 201A extending from the wall of the pan 2 towards the outside of the pan 2. Preferably, the attachment means 20A further comprise an attachment orifice 200A passing through the wall of the pan 2, which is to say extending through the entire thickness E of said wall of the pan 2. In this case, and as illustrated in the figures, the attachment element 201A preferably extends through said attachment orifice 200A. The attachment element 201A thus enters the attachment orifice 200A so as to pass through the entire thickness E of the wall of the pan.

Preferably, the attachment element 201A extends through the attachment orifice 200A, between an outside end 202A subject to the gripping part 20 and an inside end 203A fitted with a head which comes into contact with the pan 2, around the orifice 200A, as is illustrated in the figures.

Each handle 21, 22 is preferably attached to the pan 2 in the same manner, which is to say by means of corresponding attachment means comprising an attachment orifice and an attachment element compliant with the previous description.

Advantageously, the attachment element 201A at least comprises a screw 40 equipped with a head 40A and a threaded rod 40B extending from said head 40A through the attachment orifice 200A. The gripping part 20 is advantageously equipped with a tapped hole 50 into which the threaded rod 40B is screwed, wherein the head 40A (whose diameter is larger than that of the rod 40B) is positioned inside the pan 2 and comes into contact with the latter, which is to say against the inside face 30 of the lateral wall 2A.

Preferably, each handle 21, 22 is thus attached by means of a screw screwed into a tapped hole fitted in the centre of the base 210, 220 of each handle.

Preferably, the attachment means 20A at least comprise a support element 300 which is attached to the gripping part 20 and is inserted into the locking opening 50A, 50B, 60A, 60B. In the example illustrated in the figures, the support element 300 comprises lugs 301, 302 extending from each handle 21, 22. For example, each handle 21, 22 is equipped with two respective lugs 301, 302 which are made from the same material as the corresponding handle and are each fitted into a corresponding locking opening 50A, 50B, 60A, 60B. Consequently, as illustrated in FIG. 5, the two lugs of the handle 21 are respectively engaged into the locking openings 60A, 60B to prevent the rotation of the handle 21 around the axis of the screw 40. Preferably, the locking openings 50A, 50B, 60A, 60B have a substantially oblong form and the lugs forming the support element 300 are introduced into one end of these openings.

Consequently, each locking opening 50A, 50B, 60A, 60B has a double function as it permits the lid 3 to be locked onto the pan 2 by engaging with the pins 5A, 5B, 6A, 6B and to hold the handles 21, 22 in position by engaging with the lugs (or another equivalent part) of said handles.

It may however be envisaged, without this leaving the scope of the invention, to provide, instead and in place of the lugs, a deformation towards the outside of the wall 2B, so as to create a boss, wherein the latter is designed to engage with a counter-form fitted in the handle to hold the latter in position.

Preferably, the support element 300 is only provided to prevent the rotation of the handles around the axis of the attachment screw 40A, which provides the main attachment.

It may however be envisaged to attach the handles simply by engaging attachment pats with the locking openings 50A, 50B, 60A, 60B, without this leaving the scope of the invention.

It may also be envisaged, without this leaving the scope of the invention, that the handles 21, 22 are, in the usual manner, attached to a metallic bridge that is itself welded to the outside face of the lateral wall 2B.

The invention claimed is:

1. Domestic pressure cooker (1) at least comprising:
   a pan (2) which itself comprises a wall,
   a lid (3) designed to be added to the pan to form a cooking chamber with said pan,
   locking/release means (4) of the lid (3) from the pan (2), wherein the locking/release means (4) comprise at least one locking opening (50A, 50B, 60A, 60B) fitted through the wall of the pan (2) and one pin (5A, 5B, 6A, 6B) with a mobile mounting on the lid (3) between a locked position of the lid (3) where the pin (5A, 5B, 6A, 6B) is engaged inside the locking opening (50A, 50B, 60A, 60B) and a released position of the lid (3) where the pin (5A, 5B, 6A, 6B) is clear of the locking opening (50A, 50B, 60A, 60B), wherein said pressure cooker (1) further comprises a screen (100) attached to the pan (2) to mask said locking opening (50A, 50B, 60A, 60B) so that said opening is substantially hidden from the outside of the cooking chamber.

2. Pressure cooker (1) according to claim 1 in which the wall of the pan (2) itself comprises a base (2A) and a lateral wall (2B) which rises from and at the periphery of said base (2A), wherein said screen (100) is attached to said lateral wall (2B).

3. Pressure cooker (1) according to claim 1 in which said cooker also comprises a gripping part (20) attached to the pan (2), wherein said gripping part (20) is conformed and positioned on the pan (2) to form said screen (100).

4. Pressure cooker (1) according to claim 3 in which the gripping part (20) comprises a handle (21, 22) attached to the wall of the pan (2) on the outside of said pan (2).

5. Pressure cooker (1) according to claim 3 in which the gripping part (20) is attached to the pan (2) by attachment means (20A) at least comprising one support element (300) that is attached to the gripping part (20) and inserted in said locking opening (50A, 50B, 60A, 60B).

6. Pressure cooker (1) according to claim 5 in which the attachment means (20A) comprise an elongated attachment element (201A) extending from the wall of the pan (2) towards the outside of the pan (2).

7. Pressure cooker (1) according to claim 6 in which the attachment means (20A) comprise an attachment orifice (200A) passing through the wall of the pan (2), wherein said attachment element (201A) extends through the attachment orifice (200A).

8. Pressure cooker (1) according to claim 1 in which when the pin (5A, 5B, 6A, 6B) is in the locking position, a portion of said pin (5A, 5B, 6A, 6B) protrudes towards the outside of the pan (2) through the locking opening (50A, 50B, 60A, 60B), wherein the screen (100) is fitted with at least one blind inside recess (210A, 210B, 220A, 220B) opening onto the corresponding locking opening (50A, 50B, 60A, 60B) to accommodate said protruding portion of the pin (5A, 5B, 6A, 6B) inside said opening.

* * * * *